United States Patent [19]

Shipkowski et al.

[11] Patent Number: 4,683,380
[45] Date of Patent: Jul. 28, 1987

[54] APPARATUS AND METHOD FOR DETECTING A PERFORATION ON A WEB

[75] Inventors: James P. Shipkowski; Phillip W. Pearce, both of Rochester, N.Y.

[73] Assignee: Eastman Kodak Company, Rochester, N.Y.

[21] Appl. No.: 795,563

[22] Filed: Nov. 6, 1985

[51] Int. Cl.[4] ............................................. G01N 21/86
[52] U.S. Cl. .................................... 250/548; 250/557; 250/561
[58] Field of Search ................ 250/223 R, 548, 557, 250/561; 355/14 E, 68, 69, 41

[56] References Cited

U.S. PATENT DOCUMENTS

| | | | |
|---|---|---|---|
| 3,473,035 | 10/1969 | Gardner et al. | 250/548 |
| 3,936,650 | 2/1976 | Stenudd | 250/571 |
| 3,950,652 | 4/1976 | Yamashita | 250/570 |
| 4,025,186 | 5/1977 | Hunt, Jr. et al. | 355/14 R |
| 4,118,129 | 10/1978 | Grundherr | 400/144.2 |
| 4,142,105 | 2/1979 | Erdmann | 250/548 |
| 4,207,473 | 6/1980 | Nakatani et al. | 250/570 |
| 4,569,584 | 2/1986 | St. John et al. | 355/14 R |

OTHER PUBLICATIONS

Electronics, Apr. 15, 1960, M. P. MacMartin, "Sensitive Flaw Detector Solves Noise Problems", pp. 64–66.

Lambeg Industrial Research Association, Research Disclosure, No. 17322, Sep. 1978, pp. 40–43.

Primary Examiner—Eugene R. LaRoche
Assistant Examiner—David Mis
Attorney, Agent, or Firm—Norman Rushefsky

[57] ABSTRACT

A photoelectric perforation sensor for accurately detecting a perforation in a moving web. The sensor comprises two large photodiodes in a bi-cell configuration. The photodiodes lie in the direction of web travel. As the perforation begins to pass between an LED source and the bi-cell, light from the LED illuminates one photodiode but not the other. As the perforation becomes centered over the photodiodes, both photodiodes receive equal amounts of illumination and a signal is generated indicating location of the perforation. The circuit for detecting the perforation includes a first comparator circuit for comparing the output of the photodiodes with each other, a second comparator circuit for comparing the sum of the two outputs with a peak detector to arm the first comparator circuit and to prevent false triggering, and a third comparator circuit which compares the output of the peak detector with a reference voltage to shut down the system when an insufficient amount of light is being received by the photodiodes.

8 Claims, 3 Drawing Figures

APPARATUS AND METHOD FOR DETECTING A PERFORATION ON A WEB

BACKGROUND OF THE INVENTION

1. Field of the Invention

This invention relates to an apparatus and method of detecting a perforation or other indicium on a web or the like for providing signals to initiate an operation, such as for example, timing of an exposure upon a photosensitive web in an electrophotographic reproduction apparatus.

2. Brief Description of the Prior Art

Modern high speed electrophotographic copiers or reproduction machines may use flesh lamps to illuminate, i.e., expose, the original being copied. Use of this type of lamp is one way of providing the necessary exposure speed for very high speed copying. in these arrangements, the entire original is illuminated by the flash lamps providing what is known to the art as full frame exposure of the photoconductor as the photoconductor in the form of a web moves continuously during the exposure operation. Prior to the exposure a uniform primary electrostatic charge is formed on the photoconductor. Subsequent to the exposure the photoconductor, with the charge thereon modulated with the image of the original, is developed to form a visible image and this image may be transferred to a receiver sheet.

To control the various operations in this apparatus a photosensitive web may be provided with two types of perforations, one comprising a series of closely spaced perforations for providing timing signals and the other identifying frame locations on the web for use in timing or triggering flash exposures and other operations. See U.S. Pat. No. 4,025,186 to Hunt, Jr. et al. A problem with the apparatus described in this patent is that a mechanical arm is used to detect a perforation to time or synchronize the exposure operation. While the advantage of the arm is that it is successful in signaling that a perforation is present, it suffers from providing some inaccuracy as to the precise location of the perforation.

While photoelectric perforation detectors are well known, see for example, U.S. Pat. No. 3,936,650, problems arise in using such detectors with regard to determining perforation location with a high degree of precision. Also when used in an environment such as copiers described above, they are subject to contamination by toner dust. The dust settles on the components of the sensor system reducing readings to levels where random electrical noise may trigger the system to falsely indicate a perforation is present.

It is an object of the invention to provide an improved photoelectric sensor for sensing the location of an indicium such as a perforation and overcoming the deficiencies of the sensors known in the prior art.

SUMMARY OF THE INVENTION

The apparatus and method of the invention pertain to use of a bi-celled device for detecting indicia on or associated with movement of web. The respective outputs of the bi-cell are compared and if equal, indicate accurate location of the indicia vis-a-vis the bi-cell.

BRIEF DESCRIPTION OF THE DRAWINGS

The subsequent description of the preferred embodiment of the present invention refers to the attached drawings wherein.

DETAILED DESCRIPTION OF THE PREFERRED EMBODIMENTS

Because electrophotographic reproduction apparatus are well known, the present description will be directed in particular to elements forming part of or cooperating more directly with the present invention. Apparatus not specifically shown or described herein are selectable from those known in the prior art. Reference may be particularly had with regard to U.S. Pat. No. 4,025,186 the contents of which are incorporated herein.

Figure 1:
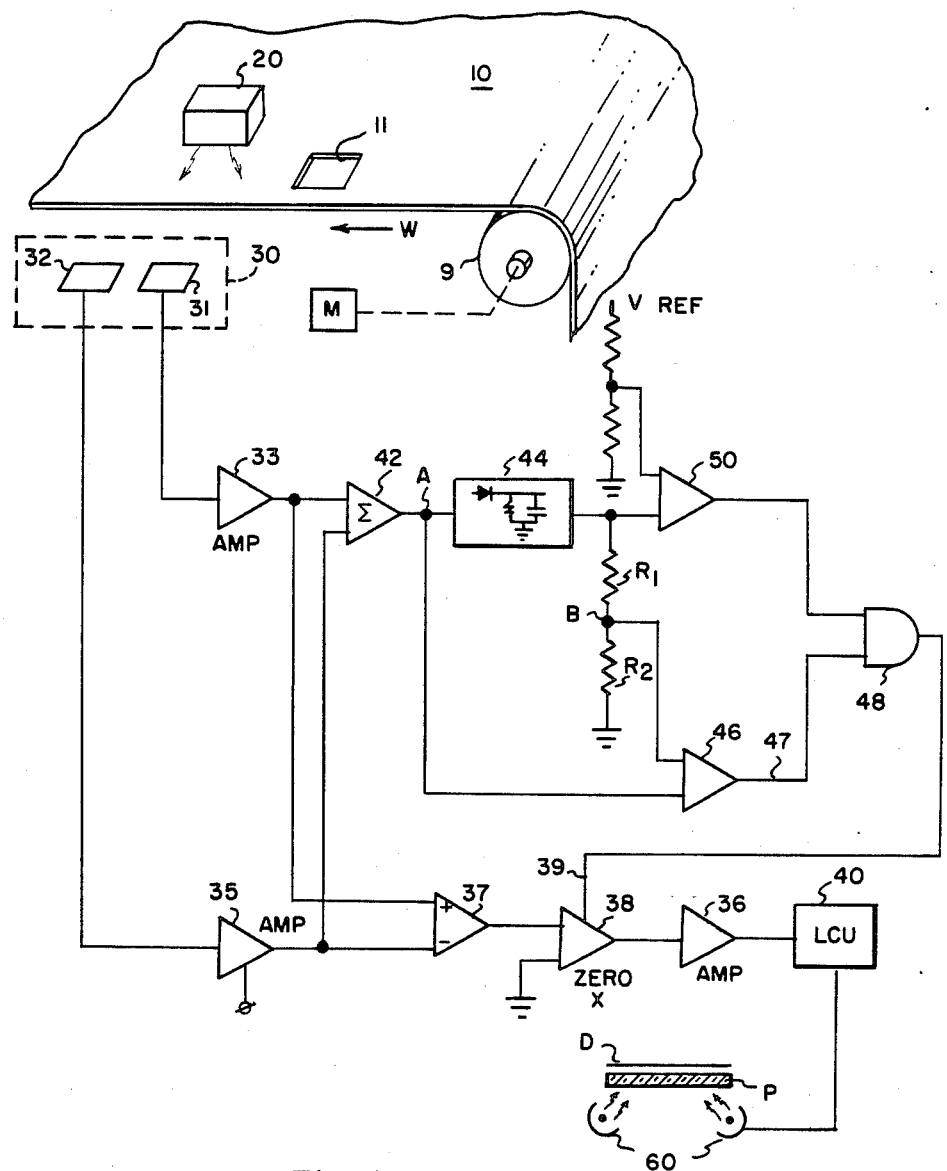
FIG. 1 is a schematic of a circuit which illustrates a sensor of the present invention.

With reference now to FIG. 1, a photosensitive film 10 includes a plurality of uniformly spaced indicia in the form of perforations 11, each located adjacent one edge of the film. Each perforation 11 (only one of which is shown) is indicative of the location of an image frame upon which an exposure is to be made on the web. That is, it is a locator for timing when an image of an original is to be exposed onto the web. The web 10 may comprise an endless belt or web having a photoconductive layer with a conductive backing on a polyester support. The description hereinafter will assume that the web, or at least the area adjacent the pertinent edge thereof, is substantially opaque to the color of light used with the sensor of the preferred embodiment. The web is driven by a motor M through a suitable drive connection to one of several rollers 9 about which the belt is trained. The roller may drive the web through a series of sprocket-like perforations (not shown) adjacent the edge or by other means well known in the art.

As shown in the figure, a light source such as an LED 20 and a photodiode bi-cell 30 are fixed, by suitable means not shown, facing opposite surfaces of the web so that the perforation 11 will pass between them. While the preferred embodiment will be described with regard to photodiodes, other photosensitive devices may be substituted for them. The photodiode bi-cell comprises two photodiodes 31, 32. The photodiodes are arranged so that they are spaced in the direction of web travel indicated by arrow W. Each of the photodiodes has its respective output amplified by amplifiers 33, 35. One or both of these amplifiers may be provided with adjustment controls for adjusting same to provide a calibration or initial balancing of the outputs of the photodiodes. The outputs of the amplifiers are each coupled to a differential amplifier 37. The amplified output of the photodiode 31 which is the first to sense the perforation is coupled to the positive terminal of the differential amplifier 37 and the amplified output of the other photodiode is coupled to the negative terminal of the amplifier 37. The output of the differential amplifier 37 is coupled to a zero crossing detector 38 which when enabled by a signal on its enabling line 39 and when detecting a null output from differential amplifier 37 emits a signal to a line driver 36 or signal amplifier. This latter signal, amplified by driver 36, is fed to the reproduction apparatus' logic and control unit 40 and is used by this microcomputerbased control unit to time the commencement for flash illumination of the original as well as other operations requiring timing.

As the perforation moves directly above the bi-cell the first or leading photodiode 31 provides a voltage output waveform that rises towards and reaches a plateau. The second or lagging photodiode 32 is initially shielded from the LED source 20 by the web. With further movement of the web the second photodiode 32 will provide a voltage output waveform that lags that of the first photodiode. As the amount of light seen by the first photodiode begins to decrease from its plateau while that seen by the second photodiode is increasing there will eventually be a point in time where the two receive the same amount of light from the LED source and this will be at a time when the perforation is centered between the two photodiodes. The two equal outputs of the photodiodes represented by the outputs of amplifiers 33, 35 will produce the null output of the differential amplifer 37. The differential amplifer 37 and zero crossing detector 38 thus cooperate to comprise a first comparator circuit capable of providing an output when the photodiodes receive equal amounts of light.

Figure 3:
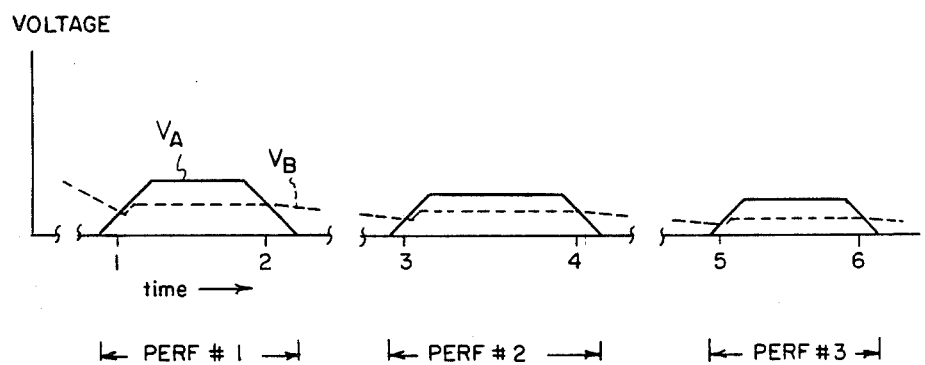
FIG. 3 is a graph illustrating voltage waveforms at points A and B in FIG. 1.

To prevent random occurrences of noise from indicating a false reading of the perforation, the circuit includes other comparator circuits which are used to "arm" or enable the first comparator circuit. Each of the amplified outputs of the photodiodes 31, 32 are coupled to a summation amplifier 42 which provides an output proportional to the sum of the two input signals. A representation of the output of amplifier 42 is shown in FIG. 3 (waveform A). As may be noted from FIG. 3, the output of amplifier 42 for each perforation is a tooth-like step with a flat crown. This output is fed to a peak detector 44 which, at terminal point B, provides an output similar to that shown as dotted waveform B.

Peak detector 44 comprises a circuit that includes a capacitor which is coupled to the output of the summation amplifier. The voltage on the capacitor tends to follow any amplitude increase in that provided by the summation amplifier during movement of a perforation over the bi-cell 30. When a perforation is not moving over the bi-cell, a high value resistor in parallel with the capacitor slowly bleeds charge from it. The resistor value is chosen based on the time interval between perforations such that the capacitor is only slightly discharged during this interval. This slight discharge is adequate to follow long term trends caused by aging or contamination. The voltage waveform at point B is similar to that of the output of the peak detector but has an amplitude that is a fixed fraction of that of the peak detector 44. This fraction is established by the resistors $R_1$, $R_2$ which serve as a voltage divider. As may be noted in FIG. 3 at points 1, 3 and 5 the voltage, $V_A$, at terminal point A begins to become greater than the voltage, $V_B$, at terminal point B. This circumstance will trigger a "high" output at arm comparator 46. This "high" output is used to enable the zero-crossing detector 38. During movement of a perforation over the bi-cell, the "high" output on line 47 will remain until the voltage $V_B$ is greater than $V_A$; these points are indicated in FIG. 3 by points 2, 4 and 6. Intervals between points 2 and 3; and between points 4 and 5 comprise intervals where a low output is provided by comparator 46 over line 47 and are used to inhibit zero-crossing detector 38. Line 47 is coupled to one input of a logic AND circuit 48. It may be noted in FIG. 3 that the peaks of waveform A very slowly diminish in amplitude. This is based on the assumption that toner contamination, etc., slowly builds up with time to reduce readings by the bi-cell. In the figure this decrease in amplitude is shown somewhat exaggerated for purposes of illustration. Also, it will be noted from FIG. 3 that the trigger points 1, 3 and 5 gradually decrease with time as contamination builds up or light output decreases with age so that the circuit establishes a new threshold for each cycle and thus adapts to the prevailing conditions. Various other known types of peak detectors or other circuit devices may be used to provide a threshold value for comparing the sum of the outputs of the photodiodes.

A third comparator circuit is provided that includes a comparator 50 for disarming the system when light levels sensed by the bi-cell are deemed to be too low to be reliable and thus comprises a low light inhibit circuit. To this comparator 50 there is input, at one input terminal thereof, the output of the peak detector 44 and at the other input terminal a predetermined reference voltage, $V_{REF}$. This latter input is related to a minimum output of the LED source or a minimum sum for the outputs of each of the photodiodes which will provide reliable signal processing. Since contamination by toner can reduce the output of the LED source or the photodiodes, the voltage, $V_{REF}$, is related to the minimum level of light providing acceptable signal processing. When the output of the peak detector 44 is less than the reference signal input to the comparator 50 the comparator output is adapted to hold line 39 "low" and thereby prevent or disarm the zero-crossing detector 38 from providing an output to the line driver amplifier 36. To accomplish this, the output of comparator 50 is coupled to a second input of logic AND circuit 48.

When both inputs to the logic AND circuit 48 are "high"—representing the conditions that the output of the peak detector 44 is higher than $V_{REF}$ and that the output, $V_A$, of the summation amplifier 42, is higher than the threshold voltage at point B—the output of the logic AND circuit is "high" and enables the zero-crossing detector 38. When the perforation is equally centered over the two photodiodes 31, 32 a "high" signal is provided to the line driver 36 and this signal is amplified and used by the apparatus logic and control unit 40 to time or commence flash illumination by lamps 60 of a document D supported on platen P. The image of the document is formed by suitable means (not shown) on the photoconductor web 10.

Figure 2:
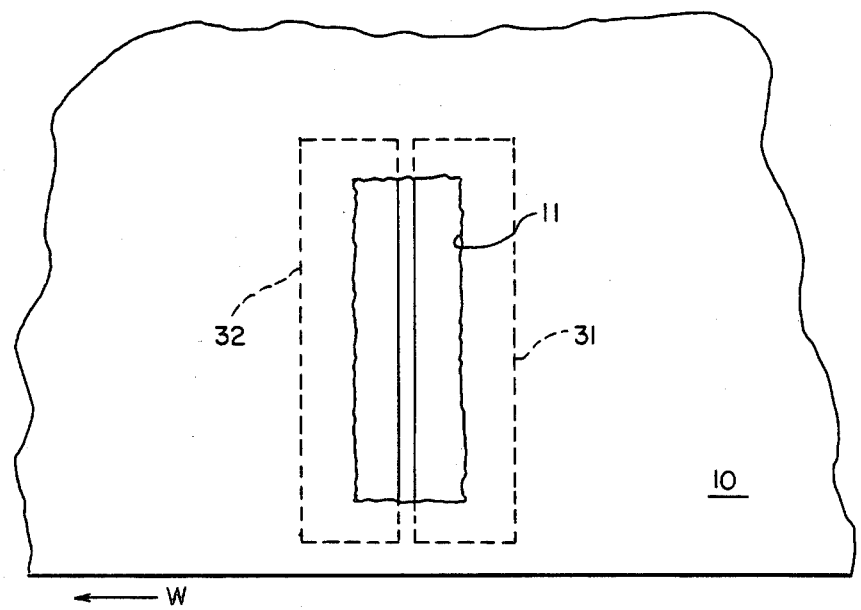
FIG. 2 illustrates a preferred relative size relationship between elements of a bi-cell photoesensor and a perforation.

With reference to FIG. 2, there is shown a preferred geometric relationship between the photodiodes and the perforation 11. This figure illustrates the relative size of the effective image of a perforation 11 upon the photodiodes 31, 32. Lenses or other well known optical or geometric means may also be used to achieve the desired effective image. The photodiodes are relatively large in the dimension transverse to the direction of web transport as compared with imperfections along side edges of the perforation (shown exaggerated) so that the imperfections along these edges have little, if any, impact in the operation of the perforation detector. The bi-cell gap is preferably made as small as possible consistent with manufacturing practice. As shown in FIG. 2, the perforation 11 is precluded by its size from permitting simultaneous illumination of both cells along their entire longitudinal dimension, i.e., their dimension in the direction of general web travel (see arrow W). It is preferred that the effective image length of the perforation upon the bi-cell in this direction be about 50% that of the bi-cell. It is also preferred that the bi-cell dimension in the direction transverse to web movement be greater than that of the image of the perforation upon the bi-cell so that cell output is maximized and good cell output levels are maintained as perforations are moved transversely because of web imperfections or web drive imperfections.

The invention has been described in detail with particular reference to the preferred embodiments thereof, but it will be understood that variations and modifications can be effected within the spirit and scope of the invention.

We claim:

1. An electrophotographic reproduction apparatus comprising:
   a photoconductive member movable along a path;
   means for moving the member along the path;
   means for performing an operation upon said apparatus in accordance with a timed sequence;
   the member including an indicium for use in timing said sequence;
   photoelectric sensing means for locating the indicium;
   the sensing means including first and second photosensitive means and light generating means adapted to project a different amount of light onto the photosensitive means in accordance with the relative positioning of the indicium vis-a-vis the photosensitive means, the photosensitive means each providing a signal related to the amount of light falling thereon, the sensing means also including
   (a). means for comparing the signals from the photosensitive means and when they are simultaneously equal, generating a third signal for performing said operation, and
   (b). means for adding together the signals from the photosensitive means and for comparing a fourth signal representing the sum of said signals with a threshold signal and for inhibiting the transmission of the third signal when the fourth signal is les than the threshold signal.

2. The apparatus of claim 1 and wherein the sensing means further includes means for establishing a low light threshold and for inhibiting the transmission of the third signal when the amount of light received by the photosensitive means is below the threshold.

3. A method for timing an operation upon a moving photoconductive member, comprising:
   moving the member along a path, the member including an indicium for use in timing the operation;
   providing a sensing means including first and second photosensitive means and light generating means, the light generating means projecting different amounts of light onto the photosensitive means in accordance with the relative positioning of the indicium vis-a-vis the photosensitive means, the photosensitive means each providing a signal related to the amount of light falling thereon;
   comparing the signals from the photosensitive means and when they are simultaneously equal, generating a third signal;
   timing the operation upon the member in response to the third signal, and
   adding together the signals from the photosensitive means and comparing a signal related to this sum with a threshold signal and inhibiting the operation upon the member when the signal related to the sum is less than the threshold signal.

4. The method of claim 3 and including the step of establishing a low light threshold and inhibiting the operation upon the member when the amount of light used for sensing the indicium is below the low light threshold.

5. A method for locating an indicium on or associated with a moving surface relative to a locating device, the method comprising:
   moving the surface past the locating device which includes a first and second sensor, each sensitive to the proximity of the indicium to the respective sensor;
   generating a signal for each sensor related to the relative proximity of the indicium with respect to each sensor;
   comparing the signal for one sensor with that for the other and providing a third signal indicating the indicium is located when the signals from the two sensors are simultaneously equal, and
   adding together the respective signals for each sensor; comparing a fourth signal representing this sum with a fifth signal establishing a threshold; and inhibiting the transmission of the third signal when the fourth signal is less than the fifth signal.

6. The method of claim 5 and including the step of comparing a sixth signal related to the fifth signal with a predetermined fixed reference signal and inhibiting the transmission of the third signal when the sixth signal is less than the predetermined fixed reference signal.

7. An apparatus for sensing a perforation on a moving web or the like, comprising:
   a photosensitive bi-cell;
   means for projecting light through the perforation onto the bi-cell, the light projecting means being located so that the web material significantly blocks light from reaching the bi-cell when the web is positioned in the light projection path between the light projecting means and the bi-cell;
   the cells in the bi-cell being oriented so that during movement of the perforation through the light projection path, light reaches one cell of the bi-cell before reaching the other cell of the bi-cell;
   means for comparing the amount of light reaching each of the cells of the bi-cell and for generating a first signal when the amounts are equal;
   wherein the cells of the bi-cell each generate an electrical signal related to the amount of light incident thereon; and including means for summing the respective signals of each cell and comparing a signal with a threshold signal and inhibiting transmission of the first signal if the sum does not surpass the threshold.

8. The apparatus of claim 7 and including means for inhibiting transmission of the first signal where the amount of light projected or received is below a threshold level.

* * * * *